United States Patent [19]

Havens

[11] 4,320,046

[45] Mar. 16, 1982

[54] METHOD FOR COLORING OLEFIN POLYMERS

[75] Inventor: Richard H. Havens, Hockley, Tex.

[73] Assignee: Gulf Oil Corporation, Pittsburgh, Pa.

[21] Appl. No.: 186,983

[22] Filed: Sep. 15, 1980

[51] Int. Cl.³ .................... C08L 23/26; C08L 35/00; C08L 23/24
[52] U.S. Cl. .................... 524/83; 8/DIG. 9; 525/192; 525/207; 524/110; 524/156; 524/190; 524/236
[58] Field of Search .................... 525/192, 207; 260/42.21; 8/4, 180

[56] References Cited

U.S. PATENT DOCUMENTS

| | | | |
|---|---|---|---|
| 3,532,656 | 10/1970 | Burdick et al. | 525/328 |
| 3,598,778 | 8/1971 | Burdick et al. | 260/29.6 H |
| 3,729,450 | 4/1973 | Galiano et al. | 525/272 |
| 3,765,829 | 10/1973 | Lambert et al. | 525/207 |

*Primary Examiner*—Carman J. Seccuro
*Attorney, Agent, or Firm*—Richard L. Kelly

[57] ABSTRACT

Ethylene or propylene polymers are dyed by dispersing a small quantity of a copolymer of a C-14 or higher alpha-olefin and maleic anhydride therein and subsequently treating the composition with an aqueous solution of a basic dye stuff such as Malachite Green.

8 Claims, No Drawings

METHOD FOR COLORING OLEFIN POLYMERS

BACKGROUND OF THE INVENTION

For many applications of olefin polymers, the art desires to supply the finished fabricated article in a colored form. This particularly is the case with fibers and house ware items. While numerous methods are disclosed in the art for coloring olefin polymers, the art is constantly seeking improved and lower cost methods for coloring olefin polymers.

SUMMARY OF THE INVENTION

The applicant has discovered that ethylene and propylene polymers can be easily and inexpensively colored by dispersing in the olefin polymer a small quantity of a copolymer of a C-14 or higher alpha-olefin and maleic anhydride and subsequently treating such compositions with an aqueous solution of a basic dye stuff such as Malachite Green.

DETAILED DESCRIPTION OF THE INVENTION

The olefin polymers employed in the invention are ethylene polymers and propylene polymers. The ethylene polymers can have a density ranging from about 0.90 to the maximum density that can be obtained with ethylene polymers. Such polymers may be made by either free radical initiated high pressure processes, or by lower pressure processes carried out in the presence of stereospecific polymerization catalysts. The preferred ethylene polymers will have polymerized therein at least about 95 weight % ethylene, with the balance being a higher alpha-olefin such as propylene, butene-1 or the like.

The propylene polymer included in the compositions of the invention can be essentially any isotactic polypropylene polymer of the type sold in commerce. Such polymers can be a propylene homopolymer, a random propylene-ethylene copolymer, a propylene-ethylene block copolymer, and the like. Frequently an elastomer will be blended with the propylene polymer to improve its impact strength, particularly at subambient temperature. The elastomer employed for this purpose can be of any type conventionally employed for such purposes with propylene polymers, including terpolymers of propylene, ethylene, and a nonconjugated diene such as hexadiene, dicyclopentadiene, and the like. It's preferred to employ propylene polymers having polymerized therein at least about 95 weight % propylene.

The higher alpha-olefin/maleic anhydride copolymer will be prepared from a C-14 or higher alpha-olefin. The preferred copolymer will be prepared from an alpha-olefin containing about 14 to 24 carbon atoms, with the C-18 alpha-olefin (octadecene) being especially preferred. Such copolymers will contain the two monomer species in equimolar ratios, unless special precautions are taken to increase the alpha-olefin content. As no advantage is obtained with the use of polymers having the higher alpha-olefin content, the compositions of the invention normally will have the two monomer species present in the equimolar ratio. Such copolymers are known and their preparations are described in the prior art, including U.S. Pat. No. 3,532,656; U.S. Pat. No. 3,598,778; U.S. Pat. No. 3,729,450; and U.S. Pat. No. Re-25,475; which descriptions are incorporated herein by reference.

The higher alpha-olefin/maleic anhydride copolymer will be included in the compositions in an amount sufficient to enable the compositions to be readily dyed with basic dye stuffs. It is thus apparent that the quantity of the alpha-olefin maleic anhydride copolymer required will be dictated in part by the intensity of color desired in the ultimate dyed articles of manufacture. For many purposes, as little as 0.1 weight % of the copolymer is sufficient for this purpose. It has been observed that the inclusion of 0.25 to 4.0 weight % of the higher alpha olefin/maleic anhydride copolymer is sufficient to provide a color level needed for all practical commercial applications.

In addition to the olefin polymer and the higher alpha-olefin/maleic anhydride copolymer, the compositions of the invention may contain minor quantities of additional components to serve conventional purposes. By way of example, antioxidants, antistatic agents, and the like may be included in the compositions.

The compositions of the invention can be prepared by any of the common techniques employed in the art to prepare blends of two or more polymers. This conventionally is done by first blending small particles of the two polymer species and then malaxating such mixture on a two-roll rubber mill, in Banbury mixers, or by extruding the mixture, or by other like techniques.

The basic dyes which can be employed to dye the compositions of the invention are those described in Chapter III of the text "The Chemistry of Synthetic Dyes" (Vol. 4), edited by K. Venkataraman, Academic Press 1971, Library of Congress Catalog Card No. 52-5201. Typical examples of suitable dyes include Malachite Green (Color Index 42000), Bismark Brown (Color Index 21000), Rhodamine B (Color Index 45170), Methylene Blue (Color Index 52015) and Brilliant Green (Color Index 42040).

The dying procedures employed are essentially similar to those employed to dye textile materials with the basic dye stuffs. The dye stuff conventionally is dissolved in water at an elevated temperature that is maintained on the acid side with a suitable acid or buffer. The item to be dyed is maintained in contact with the dying solution for an appropriate period of time. It has been observed that contact times of as little as 30 seconds are sufficient to dye films prepared from the compositions of the invention having thicknesses up to 3 mils.

The following examples are set forth to illustrate more clearly the principles and practices of the invention to those skilled in the art. Where parts or percentages are mentioned, they are parts or percentages by weight unless otherwise indicated.

EXAMPLE 1

Part A

A polymer composition was prepared by first intimately mixing 99.5 parts of a low density polyethylene resin and 0.5 part of an alpha-olefin/maleic anhydride copolymer. The low density polyethylene resin had a density of about 0.93 and a melt index of about 2.0. The alpha-olefin/maleic anhydride copolymer contained an equimolar ratio of the two monomers and was prepared from alpha-olefin consisting predominantly of a C-18 fraction (octadecene). The mixture was extruded and chopped into pellets. The pellets then were extruded to prepare blown film 2 mils thick.

Part B

Several 1"×6" strips were cut from the film prepared in Part A and were dyed by being maintained for 10 minutes in a 0.1% Malachite Green aqueous solution which was maintained at 85° C. The samples were rinsed several times in hot water and dried. The dried samples had a deep, brilliant green color.

Part C

Several of the dried samples of Part B were subjected to the wash test as set forth in the AATCC standard test method 36-1961 Test III as described in the 1963 edition of the AATCC Technical Manual. In this test the samples were washed for 45 minutes at 160° F. in a wash solution containing 0.5% neutral soap and 0.2% sodium carbonate. The wash samples were rinsed several times in water and once in a dilute acetic acid solution and then dried. All of the samples showed good dye retention in this test.

Part D

Additional dyed samples from Part B were subjected to the bleach test as set forth in AATCC standard test method 3-1962 Test III as set forth in the 1963 edition of the AATCC Technical Manual. In this test, the samples were washed for one hour at 80° C. in an aqueous solution containing 0.3% available chlorine, rinsed thoroughly, allowed to stand for 10 minutes in a 1% sodium bisulfite solution at 80° F., rinsed and pressed dry. The samples showed good dye retention in this test.

Part E

Several of the dyed samples for Part B were tested for resistance to light fading by being exposed to UV radiation for 20 hours in a Rayonette Photochemical Reactor using black light with a maximum radiation wave length of 350 microns. All of the samples showed good resistance to fading in this test.

EXAMPLE 2

Example 1, Part A, was repeated to prepare samples containing 0.5, 1.0, 3.0, and 4.0% of the alpha-olefin/-maleic anhydride copolymer. Strips 1"×6" were cut from each specimen and dyed by being maintained for 30 seconds in a 1% Malachite Green aqueous solution at 85° C. All of the samples were well dyed, with the intensity of the color increasing somewhat with increasing concentration of the alpha-olefin/maleic anhydride copolymer.

EXAMPLE 3

Example 1 was repeated except that the film strips were dyed in a 2% aqueous solution of Bismark Brown dye. Well-dyed samples were obtained which showed good resistance to washing, bleaching and UV radiation.

When Example 1 is repeated, except for substituting a linear ethylene polymer having a density of about 0.96, or an isotactic polypropylene for the low density ethylene polymer, comparable results are obtained.

What is claimed:

1. A method for coloring an ethylene or propylene polymer which consists essentially of:
    (a) Dispersing in said olefin polymer an equimolar copolymer of a C-14 or higher alpha-olefin and maleic anhydride, and
    (b) Contacting the composition of step (a) with an aqueous solution of a basic dyestuff; the quantity of the alpha-olefin/maleic anhydride copolymer incorporated into the olefin polymer in step (a) being sufficient to produce the desired intensity of color when contacted with the dye solution in step (b).

2. A method of claim 1 in which the olefin polymer is a polymer having polymerized therein at least about 95 weight % ethylene.

3. A method of claim 2 in which the olefin polymer is a polymer having polymerized therein at least about 95 weight % propylene.

4. A method of claim 1, 2, or 3 in which the alpha-olefin/maleic anhydride copolymer is a copolymer of alpha-octadecene and maleic anhydride and is included in the composition in an amount constituting about 0.25 to about 4.0 weight % of the total composition.

5. A colored olefin polymer composition consisting essentially of an ethylene or propylene polymer having dispersed therein a color body formed by contacting an equimolar copolymer of a C-14 or higher alpha-olefin and maleic anhydride with a basic dyestuff.

6. A colored olefin polymer composition of claim 5 in which the olefin polymer is a polymer having polymerized therein at least about 95 weight % ethylene.

7. A colored olefin polymer composition of claim 6 in which the olefin polymer is a polymer having polymerized therein at least about 95 weight % propylene.

8. A colored olefin polymer composition of 5, 6, or 7 in which the alpha-olefin/maleic anhydride copolymer is a copolymer of alpha-octadecene and maleic anhydride and is included in the composition in an amount constituting about 0.25 to about 4.0 weight % of the total composition.

* * * * *